United States Patent [19]

Meyn

[11] Patent Number: 4,570,294

[45] Date of Patent: Feb. 18, 1986

[54] APPARATUS FOR SEPARATING THE GIZZARDS FROM THE ENTRAILS OF POULTRY AND FOR FURTHER PROCESSING THE GIZZARDS

[76] Inventor: Pieter Meyn, Noordeinde 68C, 1511 AE Oostzaan, Netherlands

[21] Appl. No.: 499,181

[22] Filed: May 31, 1983

[30] Foreign Application Priority Data

Jun. 3, 1982 [NL] Netherlands .................. 8202240

[51] Int. Cl.[4] ............................................. A22C 17/14
[52] U.S. Cl. .......................................... 17/11; 17/50
[58] Field of Search ................................ 17/50, 43, 11

[56] References Cited

U.S. PATENT DOCUMENTS

| 3,990,128 | 11/1976 | van Mil | 17/43 |
| 4,073,040 | 2/1978 | Hill | 17/43 |
| 4,183,117 | 1/1980 | Meyn | 17/11 |
| 4,203,178 | 5/1980 | Hazenbroek | 17/50 |
| 4,434,526 | 3/1984 | van Mil | 17/50 X |

*Primary Examiner*—Willie G. Abercrombie
*Attorney, Agent, or Firm*—Julian W. Dority

[57] ABSTRACT

A gizzard processing apparatus comprising a feed section with means for detaching and removing the entrails attached to the gizzards, and a conveying section for advancing the gizzards from the feed section to a peeling section in which the lining is removed from the gizzards. The conveying section includes a rotating knife for cutting open the gizzards longitudinally thereof, spreading members for spreading apart the two halves of the cut-open gizzards and rotating brushes for cleaning the inside of the gizzards. A gizzard guide plate extends from the detaching means of the feed section to the cutting knife at the level of the horizontal path of travel of the gizzards through the feed section and a pair of conveying shafts with helical ribs longitudinal extend above the guide plate to engage the gizzards at the upper side thereof and to advance the same whereby the gizzards are moved through the apparatus along a continuous straight path.

3 Claims, 5 Drawing Figures

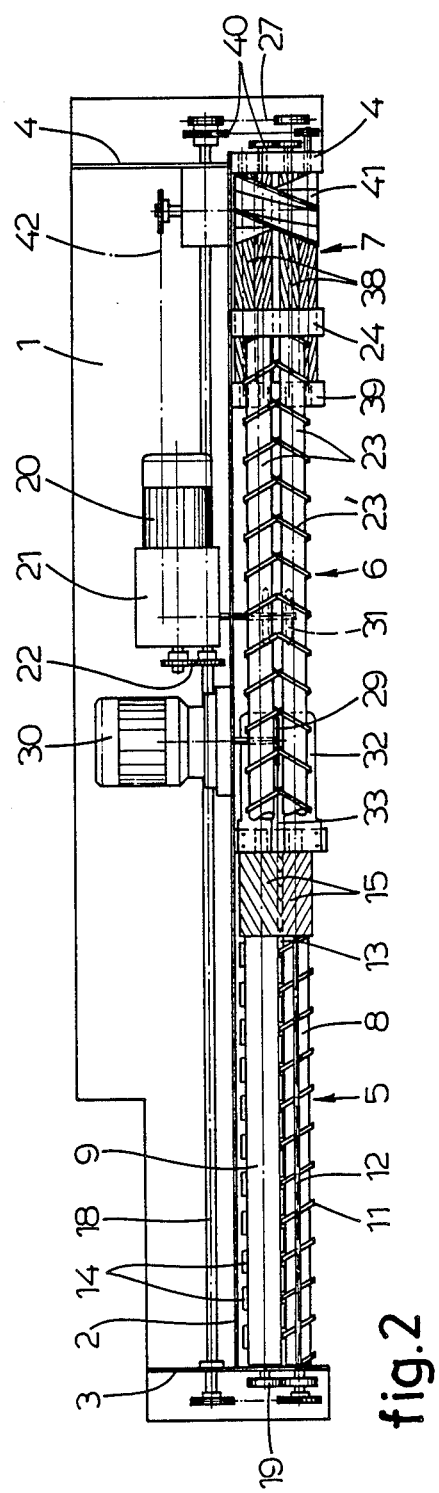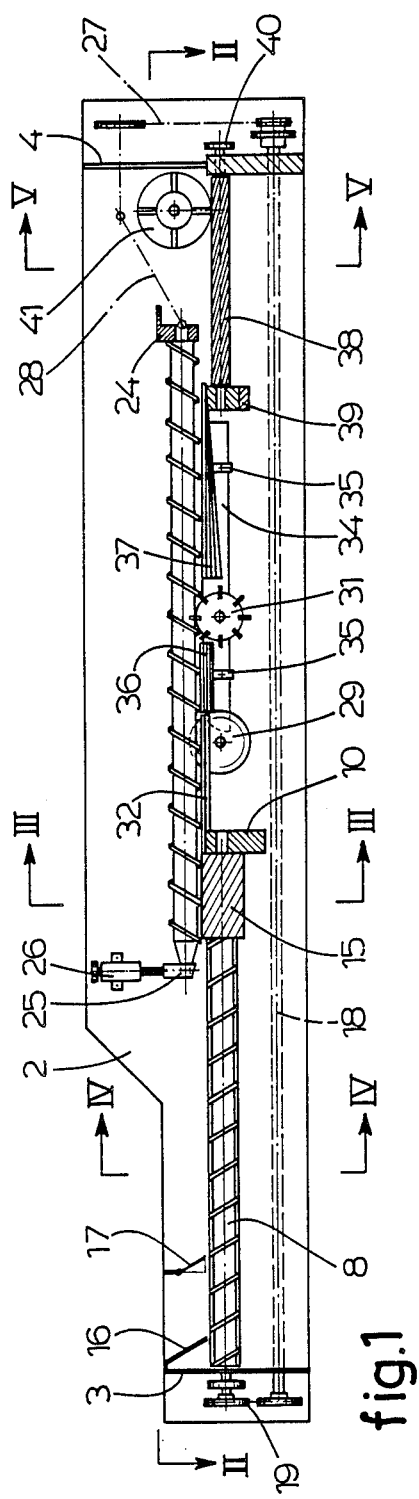

APPARATUS FOR SEPARATING THE GIZZARDS FROM THE ENTRAILS OF POULTRY AND FOR FURTHER PROCESSING THE GIZZARDS

BACKGROUND OF THE INVENTION

The invention relates to improvements in an apparatus for separating the gizzards from the entrails of poultry and for further processing said gizzards.

In an apparatus of this kind the gizzard is first separated from the further entrails, such as the gut, stomach and gullet, generally after having been removed from the carcass, whereupon the gizzard is cut open or slit, spread, cleaned on the inside and peeled to remove the inner lining thereof, see for instance the U.S. Pat. Nos. 3,172,148 to Hill, 4,203,178 to Hazenbroek and 3,579,714 to Edwards.

More in particular, the Dutch Pat. No. 165,913 to Stork Brabant B.V. discloses a gizzard separating and processing apparatus, comprising a horizontally extending feed section for the infeed of the gizzards with the further entrails, such as the gut, the stomach and the gullet, attached thereto hanging down from the gizzards which feed section has at its rear end means, such as a rotating knife, for detaching and removing these entrails from the gizzard. Following the feed section is a conveying section which comprises slitting means for cutting open the gizzard, and a driven elongate conveying means longitudinally extending above a guide member for transporting the gizzard from the detaching means to the slitting means and then past spreading means and cleaning means to a peeling section. This known apparatus has two parallel horizontal shafts having a first portion provided with helical ribs for moving the gizzard towards the detaching means for removing the hanging-down entrails, said shaft further extending into a second portion, likewise provided with helical ribs but having a smaller diameter than said first shaft portion. After passing the detaching means, the gizzard is pushed downwardly by suitable means into the space between the thinner shaft portions onto the guide member therebelow to be moved by the helical ribs to the slitting means for cutting open the gizzard. This arrangement has the drawback that the gizzards during their downward movement between the thinner shaft portions of the conveying shafts will often make a turning movement, thus loosing their original correct orientation with respect to the slitting means. This is particularly the case for small gizzards which can easily pass through the slotlike space between the thinner portions of the conveying shafts while turning about their longitudinal axes. In a gizzard processing apparatus of the present type it is, however, essential that the gizzards whatever size they have, after the removal therefrom of the entrails, are fed to the slitting knife in such a position that this knife slits the gizzards at the location of the opening formed in the gizzard wall when the entrails are separated therefrom, and to such a depth that the gizzard can be easily folded open to enable the removal of the lining. If, however, the gizzard is not properly oriented with respect to the slitting knife and is cut open at a location beside or opposite said opening there is a risk that the gizzard is completely separated into two parts and thus can not be further processed.

SUMMARY OF THE INVENTION

It is an object of the invention to provide a gizzard processing apparatus of the kind described in which the gizzards, whatever their size, are carried to the slitting knife properly oriented to be slit in the area thereof to which the entrails were attached.

Another object of the invention is to provide such an apparatus in which the gizzards after having been slit are spread apart to allow proper cleaning thereof by means of a rotating brush before being moved to the peeling section.

According to the invention, the conveying means of the conveying section of the apparatus have a forward end extending above the detaching means, and the guide member for guiding the gizzards from the detaching means to the slitting means is connected to the detaching means at the level of the path of travel of the gizzards through the feed section whereby the gizzards are moved through the apparatus along a substantially continuous straight path. This means that the gizzards, after passing the detaching means, move on towards the slitting means without changing their vertical or angular position and thus maintain their proper orientation with the opening in the gizzard wall facing downwardly allowing the slitting knife to cut the gizzard at this opening.

Further objects, features and advantages of the invention will become apparent upon reading the following description of a preferred embodiment of the invention when taken in conjunction with the accompanying drawings.

BRIEF DESCRIPTION OF THE DRAWINGS

FIG. 1 is an elevation and partly a vertical section of the gizzard processing apparatus of the invention;

FIG. 2 is a plain view of the apparatus of FIG. 1;

DESCRIPTION OF A PREFERRED EMBODIMENT

Figure 5:
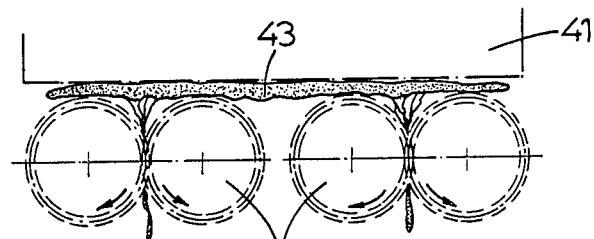
FIG. 5 is a cross-section of the peeling rolls as viewed at line V—V of FIG. 1.

Referring particularly to FIGS. 1 and 2 of the drawings, the apparatus there shown has a frame comprising a base plate 1, a vertical mounting plate 2 and endwalls 3 and 4. The apparatus comprises three sections, a feed section 5 for properly orienting the gizzards to be processed and for removing the entrails therefrom, a conveying section 6 in which the advancing gizzards are cut open, cleaned and spread apart, and a peeling section 7, for removing the inner lining of the gizzards.

The feed section 5 has two horizontally extending parallel spaced feed shafts 8 and 9 rotatably supported at one end in the endwall 3 and at the opposite end in a supporting block 10 secured to the mounting plate 2. The shaft 8 carries on its circumference a helical rib 11 and, at diametrically opposed locations, axially extending tooth-like projections 12 between the helical threads. The shaft 9 is not provided with such a helical rib in order to keep the slot 13 between the two shafts 8 and 9 as small as possible. Tooth-like projections 14 are formed on the shaft 9 which projections on rotation of the shafts 8 and 9 in the direction of the arrows shown in FIG. 4 move between the helical threads on the shaft 8 intermediate the tooth-like projections 12. The number of projections 12 and 14 can be chosen greater than shown.

Figure 3:
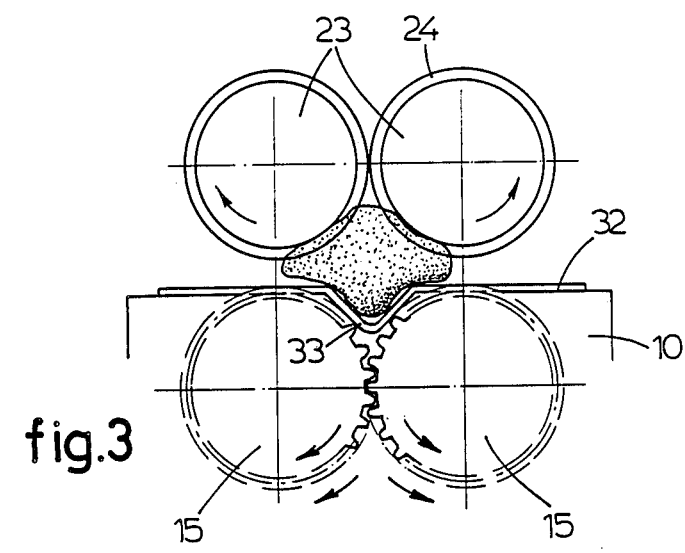
FIG. 3 is a cross-section of the pinch rolls and the conveying shafts thereabove, as viewed at line III—III of FIG. 1.

The shafts 8 and 9 carry pinch rolls 15 at their rear or right-hand ends, as seen in FIGS. 1 and 2, which pinch rolls have interengaging helical teeth (FIG. 3) and thus together form a detaching device for drawing loose the entrails of the gizzards to be treated. A feed hopper 16 is mounted above the forward end of the shafts 8 and 9 which hopper has a spring-loaded flap 17 (FIG. 1) through which the gizzards supplied to the hopper 16 pass one by one.

Figure 4:
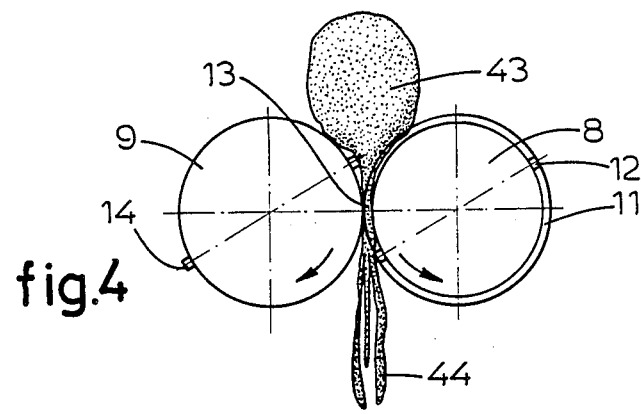
FIG. 4 is a cross-section of the feed shafts, as viewed at line IV—IV of FIG. 1.

The shafts 8 and 9 are driven in opposite direction (as indicated in FIG. 4) from a main shaft 18 via a combined gear and chain drive 19. The main shaft 18 is, in its turn, driven by an electric motor 20 through a gear box 21 and gears 22, the main shaft 18 extending across the whole length of the apparatus to the rear of the mounting plate 2 and finding support in the end walls 3 and 4.

The conveying section 6 comprises two similar parallel conveying shafts 23 extending horizontally one beside the other and each carrying on its outer surface a helical rib 23'. The rear ends of the shafts 23 are rotatably supported in a supporting block 24 secured against the mounting plate 1 whereas the forward ends of the shafts 23 are rotatably mounted in a supporting block 25 which is vertically adjustably suspended from an adjusting means 26 secured to the mounting plate 2. The conveying shafts 23 are mounted at a higher level than the feed shafts 8 and 9 extending at their forward ends closely above the pinch rolls 15 and across the whole length thereof (FIG. 1). The shafts 23 are driven from the main shaft 18 by means of a chain drive 27 and a transmission with angled shafts and universal couplings as schematically indicated at 28 in FIG. 1, the shafts 23 rotating in opposite directions as indicated by the arrows in FIG. 3 with the axes of shafts 23 and 24 being positioned above said gizzard being moved on said guide member 32 so that the lower side of said shafts press down on the gizzard.

A rotating circular knife 29 is arranged below the conveying shafts 23 in a plane parallel to these shafts and upwardly projecting into the space therebetween, the knife 29 being secured on a drive shaft of an electric motor 30 mounted on the mounting plate 2. Spaced from the knife 29 and downstream thereof are two rotating cleaning brushes 31 mounted on a common shaft extending from the gear box 21 as shown and driven thereby. A guide plate 32 extends rearwardly from the supporting block 10 past the shaft of the rotating knife 29, the knife 29 projecting through a slot in this guide plate. The elongate plate 23 has centrally formed therein a longitudinally extending troughlike portion 33 of V-shaped cross-section fitting into a correspondingly shaped recess in the upper side of the supporting block 10 in alignment of the nip between the pinch rolls 15 in such a manner that the gizzards leaving these pinch rolls with the entrails removed therefrom can pass into the trough 33 of the guide plate 32 along a continuous rectilinear path.

A vertical guide strip 34 extends midway below the shafts 23 from the knife 29 between the two brushes 31 up to the peeling section 7. This guide strip 34 is vertically adjustably secured to the mounting plate 2 by means of supports 35. The guide strip 34 carries on each of its sides laterally projecting spreading members 36 and 37, the members 36 extending between the rotating knife 29 and the brushes 31 and the members 37 extending between the brushes 31 and the peeling section 7.

Such spreading members are as such known in the art and may consist of a plurality of rods enclosing varying angles with the vertical guide strip 34 so as to gradually spread apart the portions of the gizzards slit by the knife 29 and to maintain these parts in the spread position. The peeling section 7 can be of any suitable type and, as shown, may comprise four parallel peeling rolls 38 each provided with helical teeth and arranged in two interengaging pairs in a manner known in the art (see also FIG. 5). The peeling rolls are, at their forward ends, rotatably supported in a supporting block 39 secured to the mounting plate 2 and, at their rear ends, in the endwall 4, the peeling rolls 38 being driven by the main drive shaft 18 through a chain and gear drive 40 so as to rotate in the directions as indicated by the arrows shown in FIG. 5. As can be seen in FIG. 1, the conveying shafts 23 partly overlap the forward ends of the peeling rolls 39 extending therebelow, the spreading members 37 extending up to these peeling rolls. Finally, above the rear end of the peeling rolls there is mounted a blade wheel 41 for cleaning the upper side of the spread-apart gizzards which blade wheel is driven from the gear box 21 through a transmission 22.

The apparatus operates as follows. The gizzards to be processed with the entrails attached thereto are fed into the hopper 16 from which they are one by one released by the flap 17 onto the feed shafts 8 and 9 (FIG. 4). The entrails 44 attached to the gizzards 43 are periodically engaged by the projections 12 and 14 of the feed shafts 8 and 9 to be pulled down thereby through the slot 13 between the shafts in which however the gizzard 43 itself remains supported on the shafts and is conveyed forwardly by the helical rib 11. The gizzard 43 is thereby forced to assume a position in which the portions thereof to which the entrails (crop, gullet and stomach on the one hand and gut on the other hand) are attached face downwardly. When the gizzard reaches the pinch rolls 15, (FIG. 3) the entrails are caught by the interengaging teeth of these rolls and are pulled away from the gizzard whereby a hole in the gizzard wall is formed. During the passage of the gizzard across the pinch rolls 15 it is held confined between these rolls and the conveying shafts 23 thereabove which shafts 23 advance the gizzard with the same forward speed as the pinch rolls 15. After leaving the pinch rolls 15 the gizzard enters the trough 33 of the guide plate 32 in a straight continuous movement, the helical ribs 23' of the shafts 23 engaging the gizzard at the upper side thereof to continuously advance the same along a straight path confined between the trough 33 and the conveying shafts 23. The gizzard is thus fed to the rotating knife 29 without any possibility of turning away from its initial position with the opening formed therein facing downwardly whereby the knife 29 will slit the gizzard at the location of this opening and to such a depth that the two parts of the gizzard thus formed are still attached to each other at their upper side allowing the two gizzard parts to be spread apart laterally. This is first done by the spreading members 36 which fold open the gizzard sufficiently to allow the removal of the contents thereof by the two rotating cleaning brushes 31. After passing these brushes, the gizzard is further spread apart by the spreading members 37 whereupon it reaches the peeling rolls 38 in a substantially flat position (see FIG. 5) to be pushed against these peeling rolls by the rear ends of the conveying shafts 23. These peeling rolls engage the lining of the gizzard pulling it away from the gizzard wall in the known manner while at the same time further advancing the gizzard to a position below the blade wheel 41 which cleans the upper side of the gizzard. Finally at the rear end of the peeling rolls the gizzard, now fully processed, is carried off by means not shown.

In a manner known as such means can be provided to continuously clean the peeling rolls 39 from below by water jets (not shown); also a trough can be arranged below the apparatus for catching and carrying away the detached entrails and the contents of the gizzards removed by the brushes 31 as well as the removed linings of the gizzards and flushing water. Furthermore, the several transmissions and drive means will normally be covered by suitable housings.

While the invention has been described with reference to a preferred embodiment thereof, it will be understood that variations and modifications can be effected within the scope of the invention as defined in the appended claims.

I claim:

1. An apparatus for separating the gizzards from the entrails of poultry and for further processing said gizzards, comprising a horizontally extending feed section for the separate infeed of the gizzards along a substantially horizontal path of travel in a position in which the entrails attached thereto are hanging down from the gizzard, said feed section comprising at its rear end elongated means for detaching and removing the entrails hanging down from the gizzard, a conveying section comprising slitting means for cutting open each gizzard, a guide member for said gizzards longitudinally extending between said detaching means and said slitting means, spreading means for spreading apart the opened gizzard, and cleaning means for removing the contents of the gizzard, and a peeling section for removing the interior lining from the opened and spread gizzard, said conveying section further comprising a driven elongate conveying member longitudinally extending above said guide member and said slitting, spreading and cleaning means respectively and adapted to engage the gizzard at its upper side to move the latter along said guide means from said detaching means to said slitting means and then past said spreading means and cleaning means to said peeling section, said conveying means having a forward end extending above said detaching means of said feed section and includes two parallel elongated shafts rotating in opposite directions with the axes of said shafts being positioned above said gizzard being moved on said guide member so that the lower sides of said shafts press down on the upper portion of said gizzard, said guide member including an elongated plate having a central portion forming a longitudinal extending trough-like channel, and said guide member being connected to said detaching means at the level of said gizzard path of travel through said feed section, whereby the gizzard is moved through the apparatus along a substantially continuous straight path.

2. The apparatus of claim 1 in which said peeling section comprises a number of parallel toothed peeling rolls, said conveying shafts extending above the forward portion of said peeling rolls.

3. The apparatus of claim 1 in which said feed section comprises two parallel shafts rotating in opposite directions, at least one of said shafts having a helical rib on its outer surface, and in which said pinch rolls are mounted on the rear end of said feed section shafts, said shafts being supported in a supporting block arranged closely to the rear of said pinch rolls, said supporting block having an upper face provided with a longitudinally extending recess, said guide plate having a forward end portion mounted on said supporting block upper face with said trough-like channel fitting in said recess.

* * * * *